Dec. 13, 1927.
W. I. KASER
1,652,943
TRANSMISSION
Filed Sept. 4, 1926  5 Sheets-Sheet 1
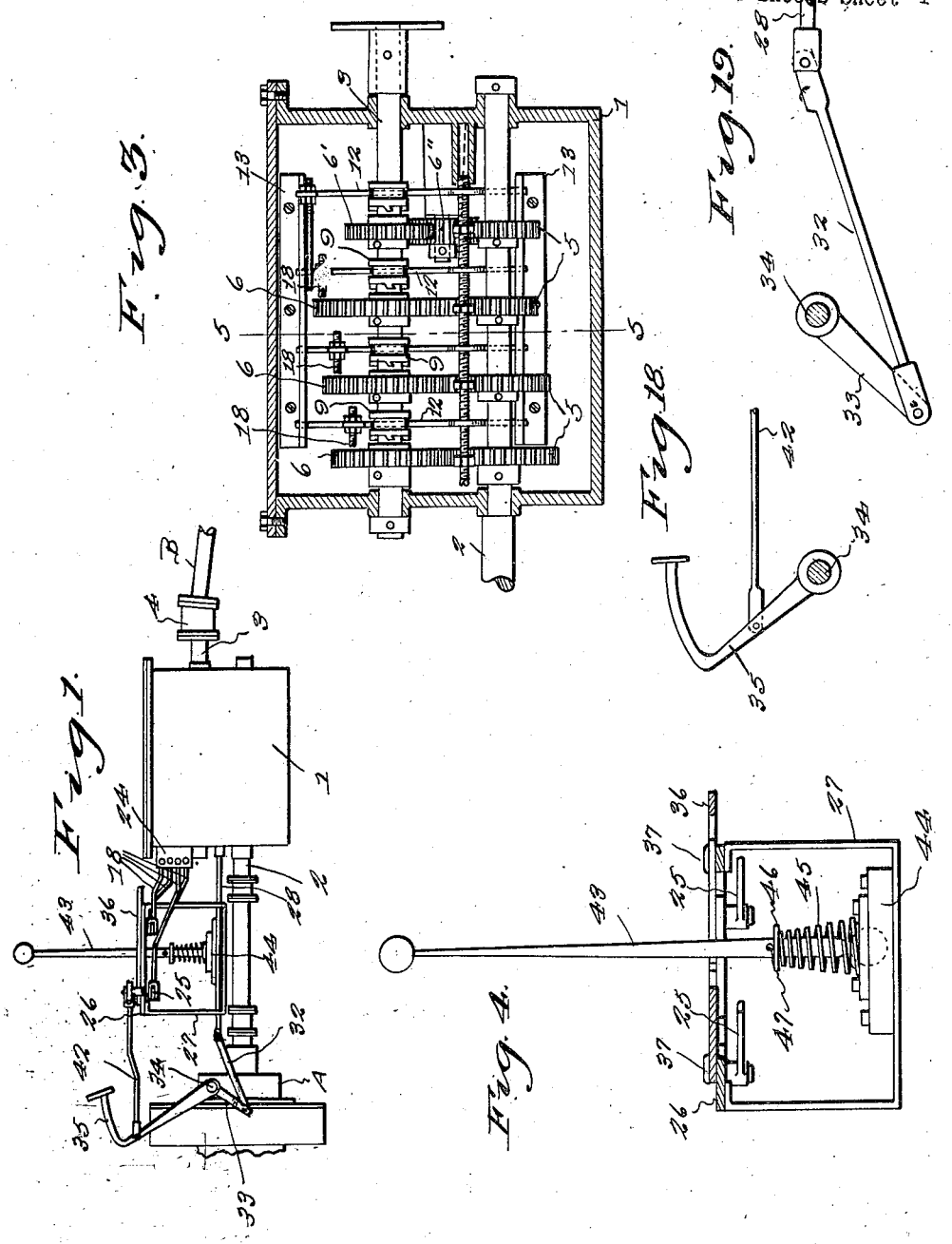
W. I. Kaser INVENTOR
BY Victor J. Evans
ATTORNEY
WITNESS:

Dec. 13, 1927.
W. I. KASER
1,652,943
TRANSMISSION
Filed Sept. 4, 1926   5 Sheets-Sheet 2
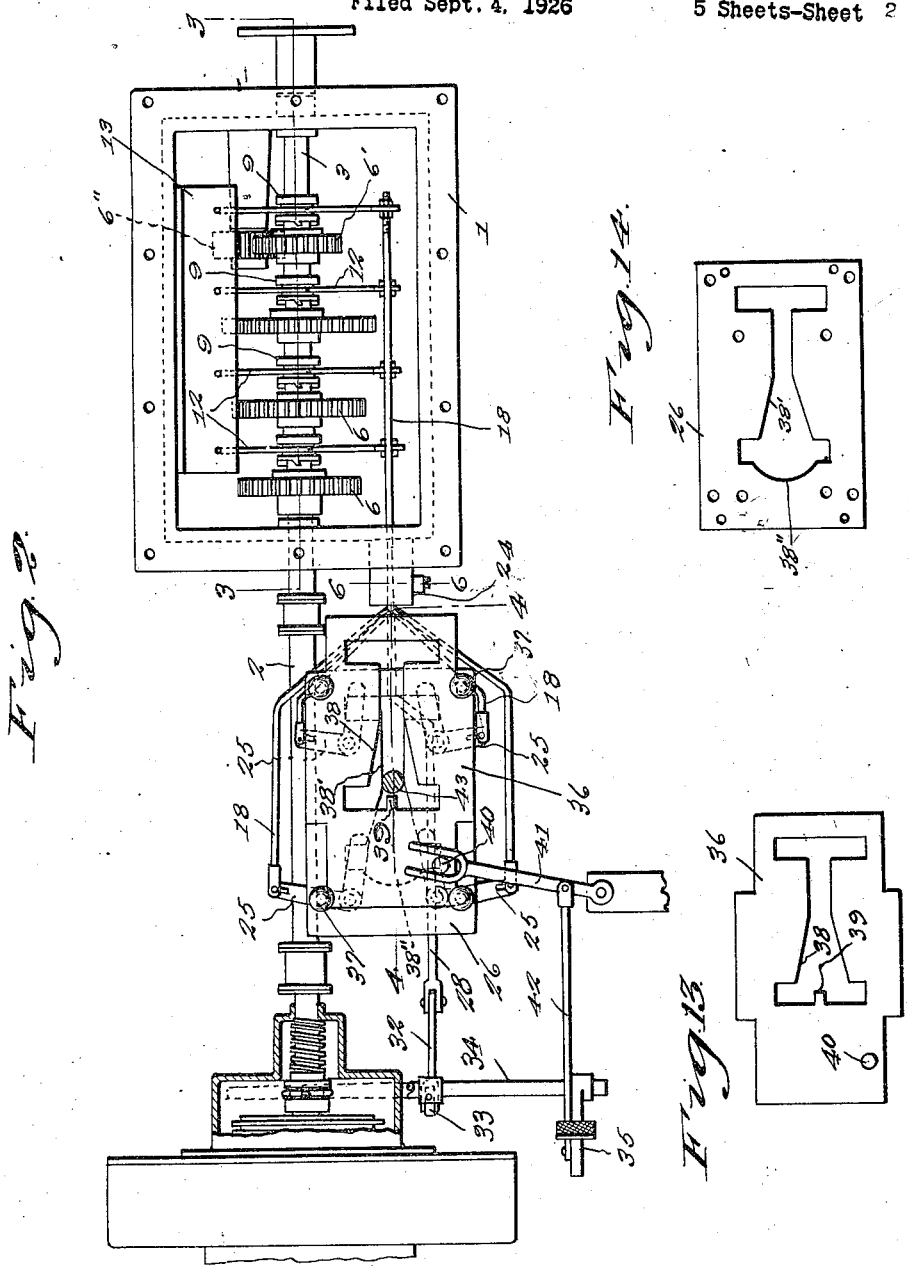
WITNESS:
R. A. Thomas
W. I. Kaser   INVENTOR
BY Victor J. Evans
ATTORNEY Dec. 13, 1927.

W. I. KASER 1,652,943

TRANSMISSION

Filed Sept. 4, 1926  5 Sheets-Sheet 3

W. I. Kaser INVENTOR

BY *Victor J. Evans*

ATTORNEY

WITNESS:

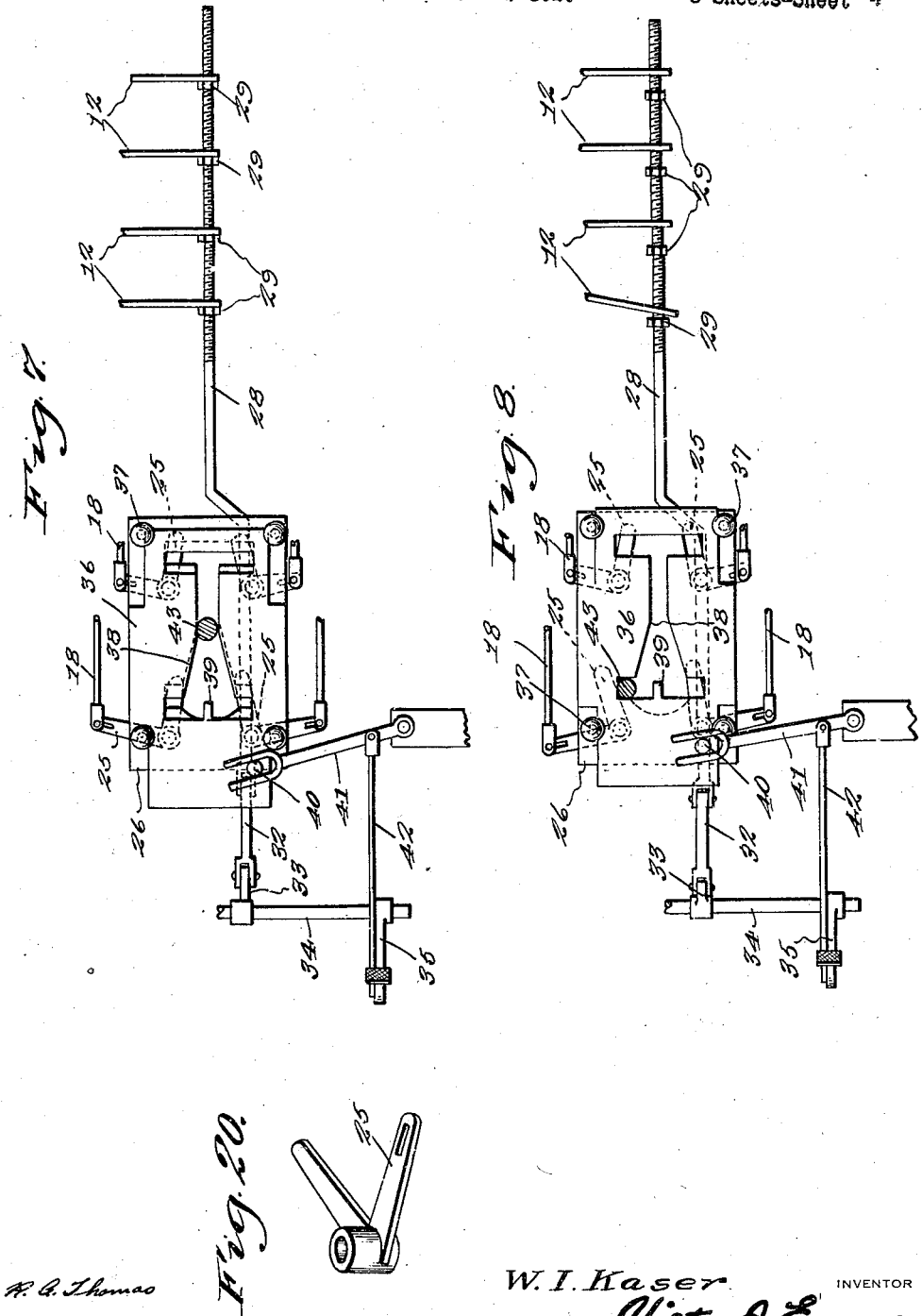

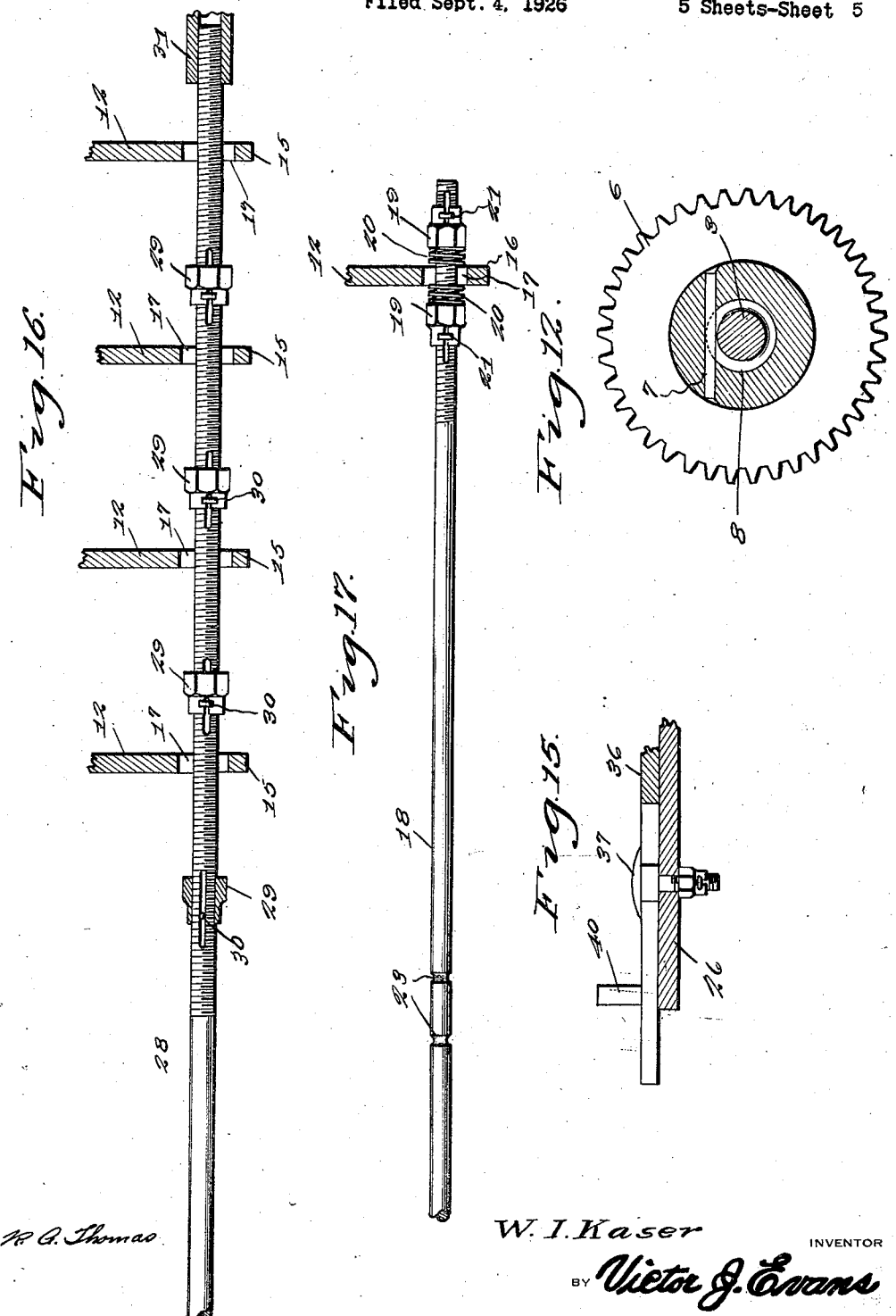

Patented Dec. 13, 1927.

1,652,943

UNITED STATES PATENT OFFICE.

WALTER I. KASER, OF BALTIC, OHIO, ASSIGNOR OF ONE-THIRD TO THOMAS G. MACPHERSON AND ONE-THIRD TO WARNER E. FARVER, BOTH OF BALTIC, OHIO.

TRANSMISSION.

Application filed September 4, 1926. Serial No. 133,637.

This invention relates to transmission means for motor vehicles and the like, the general object of the invention being to provide clutches for connecting gears on a driven shaft with said shaft, said gears being constantly rotated from the gears on the drive shaft, with shifting means for operating the clutches, which are so arranged that one clutch cannot be moved to clutching position while another clutch is in this position.

A further object of the invention is to provide a shifting lever for moving the clutches into clutching position, with means for normally holding the lever in neutral position, the clutches being held in set position by friction means.

Another object of the invention is to provide means operable from the clutch pedal for releasing the clutches, with means, also operable from the clutch pedal, for preventing movement of the shifting lever until the clutch pedal has been depressed.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view showing the invention located between the jack shaft and the clutch means of a vehicle.

Figure 2 is an enlarged plan view of the invention, with parts in section with the clutch pedal in running position, but with the improved clutch means in inoperative or neutral position.

Figure 3 is a section on line 3—3 of Figure 2.

Figure 4 is a section on line 4—4 of Figure 2.

Figure 7 is a diagrammatic plan view showing the parts with the shifting lever in neutral position and with the clutch pedal in fully depressed position.

Figure 8 is a similar view, but showing the parts with the shifting lever in high speed position and with the clutch pedal in partly depressed position.

Figure 12 is a sectional view through portion of this gear.

Figure 13 is a view of the sliding plate of the shifting mechanism.

Figure 14 is a view of the stationary plate thereof.

Figure 15 is a detail sectional view through these plates, showing how they are connected together.

Figure 16 is a view of the push rod passing through portions of the clutch shifting plates.

Figure 17 is a view of one of the pull rods and showing its connection with a clutch shifting plate.

Figure 18 is a view of the clutch pedal and a part of the link which connects it with the sliding plate.

Figure 19 is a view showing the means for connecting the clutch pedal shaft with the push rod.

Figure 20 is a view of one of the bell cranks which are engaged by the shifting lever.

Figure 5:
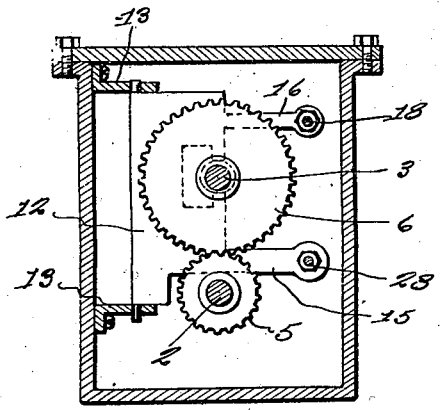
Figure 5 is a section on line 5—5 of Figure 3.
Figure 9:
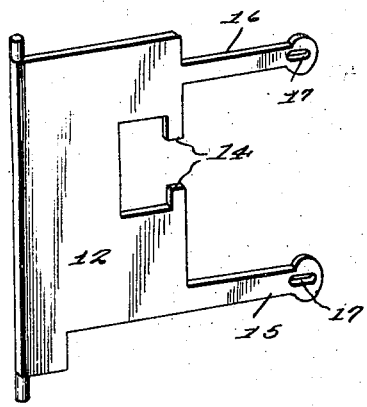
Figure 9 is a perspective view of one of the clutch shifting plates.
Figure 6:
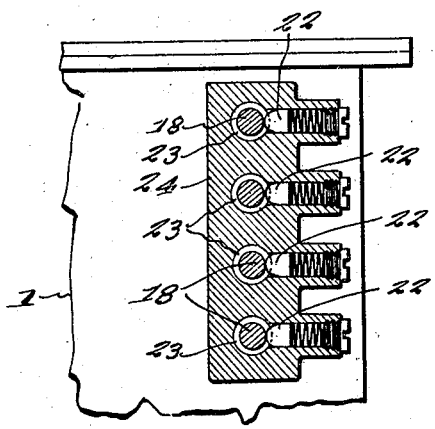
Figure 6 is a section on line 6—6 of Figure 2.
Figure 10:
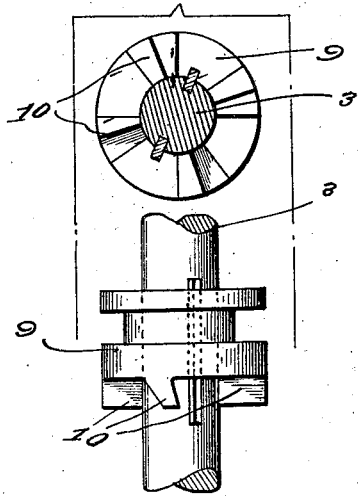
Figure 10 shows two views of one of the clutch collars.
Figure 11:
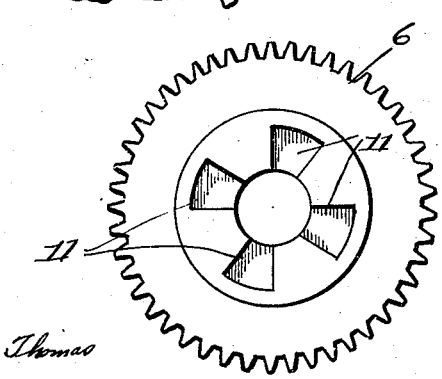
Figure 11 is a view of one of the driven gears, showing the clutch recesses therein.

In these views, 1 indicates a casing for enclosing portions of the transmission means, 2 indicating the drive shaft which is suitably connected with the clutch A of the motor and 3 indicates the driven shaft of the transmission which is connected by the universal joint 4 of the jack shaft B. Gears 5 are fastened to the shaft 2 and these gears mesh with the gears 6 which are rotatably arranged on the shaft 3. The gear 6' meshes with an idle gear 6'' suitably supported in the casing and meshing with one of the gears 5 so that the shaft 3 will be rotated in a reverse direction by the shaft 2, when these gears 6'' and 6' are in active position. I prefer to connect the gears 6 with the shaft by means of the pins 7 which pass through the hubs of the gears and engage annular grooves 8 in the shaft 3. Clutch collars 9 are keyed to the shaft 3 so that they have sliding movement thereon and each collar is provided with the teeth 10 for engaging the recesses 11 in a gear 6 to connect the gear with the shaft. A hinged plate 12 is provided for shifting each clutch collar 9, these plates being pivotally connected with the brackets 13 in the casing and having the projections 14 thereon for engaging the grooves in the clutch collars. Each plate is provided with a lower arm 15 and an upper arm 16, the extremity of each arm having a slot 17 therein. The upper arms 16 of the plates are staggered so that they are in different horizontal planes. A pull rod 18 is connected to the upper arm of each plate, the rod passing through the slot 17 and having a pair of nuts 19 thereon with a spring 20 between each nut and the arm. The nuts are locked in adjusted position by the pins 21 engaging slots in the rod. Each rod is held in either one of its two positions by the spring plunger 22 engaging either one of a pair of grooves 23 in the rod, these plungers being arranged in an extension 24 at the front end of the casing 1, the rods passing through the said extensions and each rod has its outer end pivoted to a bell crank 25 which is pivoted adjacent each corner of a plate 26 which is fastened to the top of a supporting bracket 27. A push rod 28 passes through the slots in the lower arms 15 of the hinged plates 12 and the inner end of this rod 28 is threaded to receive the nuts 29, one for each plate, the nuts being held in adjusted position by the pins 30 which pass through slots in the rods. A socket 31, on the rear wall of the casing, forms a guide in the reciprocatory movement of the rod. The nuts are so arranged that when the rod is pushed inwardly, they will engage any of the plates 12 which have been swung forwardly by the pull rods to engage the clutches so that this push rod acts to disengage the clutches. This push rod is connected by the link 32 with a depending arm 33 on the clutch shaft 34 to which the clutch pedal 35 is connected. Thus when the pedal is depressed to its full extent, the rod is pushed to a position to cause its nuts to move any of the hinged plates 12 to inoperative position as shown in Figure 7, but when the clutch pedal is but partly depressed to release the clutch A, the rod 28 will be moved to a position where its nuts 29 will not interfere with the movement of the plates 12 to engage the clutch collars 9, as shown in Figure 8.

A plate 36 is slidably mounted on the plate 26 by means of the studs 37 which are carried by the plate 26 and have their intermediate portions engaging the side edges of the reduced end portions of the plate 36, with the heads of the studs overlapping the plate 36 to hold said plate on the plate 26. Thus the plate 36 has limited sliding movement on the plate 26. Each plate is provided with a substantially Y-shaped opening 38, the opening 38′ in the plate 26 having a rounded top wall 38″, while the opening in the plate 36 has a flat top wall, with an inwardly extending tongue 39. The bell cranks 25 are so arranged that their free arms extend across the lateral portions of the opening in the plate 26 to which plate said bell cranks are pivoted. The plate 36 has a post 40 thereon which is engaged by the fork of a lever 41 which is connected by a link 42 to the clutch pedal so that when the pedal is depressed, the plate 36 is moved forwardly on the plate 26 so that the openings in the two plates will register with each other. Normally, the rear end of the opening in the plate 36 extends beyond the rear end of the opening in the plate 26, as shown in Figure 2, with the front portion of the opening 38 overlying the central portion of the opening 38′.

The shifting lever 43 has its ball-shaped end swiveled in a support 44 at the bottom part of the bracket 27 and said lever extends through the openings in the two plates 26 and 36. The lever is normally held in vertical position by a coiled spring 45 at its lower end and which engages a washer 46 held in place at the lower part of the lever by a pin 47 so that the pressure of the spring tends to hold the lever in vertical and neutral position.

With the parts shown in Figure 2 arranged as shown, the clutches are out of engagement and the gears 6 on the driven shaft rotate with the shaft stationary. When the vehicle is to be started, the clutch pedal is partly depressed, which will release the clutch A in the usual manner and cause the forked lever 41 to shift the plate 36 forwardly on the plate 26 so that the opening 38 will register with the opening 38′ as shown in Figure 8. Then the gear shift 43 is moved rearwardly and into the left hand notch formed by the openings 38 and 38′ and as it enters the notch, it strikes the arm of the bell crank 25 which extends across the said notch and thus rocks the bell crank and causes it to pull upon the pull rod 18 to which it is connected and thus cause the hinged plate, engaged by the rod, to move the clutch collar into engagement with its gear. As will be seen from Figure 8, the movement of the rod 28, by the partial depression of the clutch pedal, will not cause the nuts 29 to interfere with the movement of the hinged plate. Thus the driven shaft will be driven at slow speed from the drive shaft when the clutch pedal is released by the foot and the parts will be held in this position by the plunger 22 engaging the groove in the push rod 18 so that the lever 43 can return to its neutral position. The clutch pedal is then fully depressed, which will cause the push rod 28 to move rearwardly to its full extent and one of its nuts 29 will strike the hinged plate 12 of the clutch of the low speed arrangement and thus cause said plate to disengage the clutch as shown in Figure 7. The clutch pedal is then partly released to place the parts in the position they occupy in Figure 8 and then the lever 43 is moved into the second speed notch at the upper left hand part of the openings so as to rock the bell crank at this point to cause it to connect the second speed gear with the driven shaft 3. The lever 43 must return to its neutral position each time it is shifted so as to permit the clutch pedal to return to its normal position to throw in the clutch A. The shift to third or high speed and to reverse are made in the same manner. The lever 43 may be used to move the plate 36 forwardly, without operating the foot pedal with the foot, when the shift is to be made into second or third speeds. When this is done, the lever 43 must push the plate 36 far enough until the lever engages the rounded wall 38″ of the opening 38′, which will move the parts to clutch releasing position, after which the shifting lever is moved rearwardly slightly so that it can be passed into either the second speed notch or the third speed notch.

As before stated, this invention will prevent stripping of the gears, as it is impossible to connect one gear with the driven shaft while another gear is so connected.

What I claim is:—

1. Transmission means of the class described comprising shafts, intermeshing gears on the shafts, clutches for connecting the gears on one shaft to said shaft, a shifting lever, means actuated thereby for moving the clutches to clutching position, locking means for preventing the lever from actuating such means and manually operated means for moving the locking means and the clutches to releasing position.

2. Transmission means of the class described comprising shafts, intermeshing gears on the shafts, clutches for connecting the gears on one shaft to said shaft, a shifting lever, means actuated thereby for moving the clutches to clutching position, locking means for preventing the lever from actuating such means, a foot pedal for moving the locking means to releasing position and means actuated by the foot pedal for moving the clutches to releasing position.

3. In a motor vehicle, transmission means comprising shafts, intermeshing gears on the shafts, clutches for connecting the gears on one shaft to said shaft, a shifting lever, means actuated thereby for moving the clutches to clutching position, locking means for preventing the lever from actuating such means, a foot pedal for actuating the main clutch of the vehicle, means actuated thereby for moving the locking means to releasing position and means actuated by the pedal for moving the clutches of the gears to releasing position.

4. In a motor vehicle, transmission means comprising shafts, intermeshing gears on the shafts, clutches for connecting the gears on one shaft to said shaft, a shifting lever, a stationary plate having a Y-shaped opening therein through which the lever passes, a movable plate mounted on the stationary plate and having a Y-shaped opening therein which is normally out of register with the opening in the stationary plate, a bell crank pivoted to each corner of the stationary plate and having an arm extending across a lateral part of the opening in the stationary plate so that said arm will be moved when the lever is pushed into said lateral part, means actuated by the levers for moving the clutches into clutching position, means for connecting the clutch pedal of the vehicle to the movable plate to move said plate when the pedal is depressed and means actuated by the pedal for releasing the clutches of the gears.

5. Transmission means comprising a drive shaft, a driven shaft, intermeshing gears on the shafts, clutches for connecting the gears of the driven shaft with said shaft, a pull rod for moving each clutch into clutching position, a shifting lever for moving the pull rods, a push rod for disengaging the clutches, a pedal for actuating the same, locking means for preventing the pull rods being actuated by the shifting lever and means actuated by the pedal for moving the locking means to releasing position.

6. In combination with transmission means of a motor vehicle, a shifting lever, a projection thereon, a ball and socket connection between the lever and its support and a coiled spring on the lower end of the lever and engaging the projection for normally holding the lever in vertical position.

In testimony whereof I affix my signature.

WALTER I. KASER.